United States Patent [19]
Kuschnereit

[11] Patent Number: 6,132,509
[45] Date of Patent: Oct. 17, 2000

[54] TRANSPORTABLE WASH AND PAINT FACILITY

[76] Inventor: Gene L. Kuschnereit, 490 High Flume Loop, Durango, Colo. 81301

[21] Appl. No.: 09/133,137

[22] Filed: Aug. 12, 1998

Related U.S. Application Data

[60] Provisional application No. 60/055,516, Aug. 13, 1997.

[51] Int. Cl.[7] ........................................................ B05C 5/00
[52] U.S. Cl. ........................... 118/64; 118/66; 118/72; 118/73; 118/603; 118/610; 118/317; 118/323; 118/326; 134/167 R; 134/168 R; 239/289
[58] Field of Search ........................... 118/64, 66, 72, 118/73, 603, 610, 317, 323, 326; 134/167 R, 168 R; 239/289; 427/421

[56] References Cited

U.S. PATENT DOCUMENTS

| | | | |
|---|---|---|---|
| 2,280,984 | 4/1942 | Thurnau | 304/9 |
| 2,810,336 | 10/1957 | Sheffer et al. | 98/115 |
| 4,237,780 | 12/1980 | Truhan | 98/115 |
| 4,532,886 | 8/1985 | Bouchard | 118/326 |
| 4,770,088 | 9/1988 | Kistner | 98/115.2 |
| 4,872,419 | 10/1989 | Blankemeyer et al. | 118/64 |
| 4,932,354 | 6/1990 | Kistner | 118/305 |

Primary Examiner—Laura Edwards
Attorney, Agent, or Firm—John R. Lansdowne

[57] ABSTRACT

A self-contained, trailer-mounted, portable wash and paint facility particularly useful to retrieve a grease disposal container having a removable lid, wash dirt and grease from the container, repaint the container, and return it to service. The facility contains an extendable boom and winch to handle the container and bring it into the facility. A vat agitated with compressed air is provided containing a heated caustic solution wherein lids are soaked as part of the cleaning process. A trolley mounted winch is provided which assists in removing the container lid and moving it to and from the soaking vat. A circulating high pressure wash system is provided for high pressure spraying of heated soapy cleaning solution. The cleaning system has a high-pressure washer and tank with a delivery hose and nozzle for the operator to employ when washing the grease container. The floor of the facility contains a grate where used cleaning solution is collected in a catch tank. The catch tank features a screen basket for catching large debris, and an upper and lower compartment. The upper compartment has a skimmer for removing grease and oil from the solution, and skimmer tubes allow solution to flow to a lower compartment where silt settles and solution is collected. The solution from the catch tank is recycled through a three stage filter to the washer.

20 Claims, 10 Drawing Sheets

TRANSPORTABLE WASH AND PAINT FACILITY

Claiming Priority from Provisional App. No. 60/055,516 filed Aug. 13, 1997.

FIELD OF THE INVENTION

The present invention relates to wash and paint facilities. More particularly, the present invention relates to self-contained, transportable wash and paint facilities for maintaining grease containers or other soiled objects for which cleaning and repainting is desirable.

BACKGROUND OF THE INVENTION

The present invention is a self-contained, wash and paint facility, which may be transportable on a truck bed or trailer to a work site. At the site the facility can be used to retrieve the object to be processed, bring it into the facility, wash dirt and grease from the object, repaint the object, and return it to service. All such operations are performed inside the facility in an environmentally safe manner. The facility also has the capability of making limited repairs to the object before painting.

The facility is particularly useful for processing grease containers, but it also may be used for the processing of other objects which will fit with the truck or trailer, such as refuse and other containers, engines, machinery, equipment, and other objects which accumulate organic or inorganic dirt, grease, and/or oils. After cleaning, all such objects may also be painted.

Operation of a transportable cleaning and painting facility, capable of travel to the site of objects to be cleaned and painted, offers significant savings in labor, transportation, and facility costs. Such a system totally eliminates the need to establish and maintain a central cleaning plant and the need to transport objects to the central plant and back to the site. Further, on site servicing eliminates downtime for container or the like, and the need for providing a replacement while cleaning and painting takes place at a central plant.

Such a system totally eliminates the need to establish and maintain a central cleaning plant and the need to transport objects to the central plant and back to the site. Further, on site servicing eliminates downtime for container or the like, and the need for providing a replacement while cleaning and painting takes place at a central plant. Such a system totally eliminates the need to establish and maintain a central cleaning plant and the need to transport objects to the central plant and back to the site. Further, on site servicing eliminates downtime for containers or similar objects, and the need for providing a replacement while cleaning and painting takes place at a central plant.

SUMMARY OF THE INVENTION

It is an object of the invention to provide a self-contained, wash and paint facility which may be transported to the site of objects to be cleaned and painted.

It is a further object of the invention to provide a means by which large, heavy objects to be cleaned and painted may be retrieved into the facility, washed free of dirt and grease, repainted, and returned to service in a short period of time.

It further is an object of the invention to provide a means to make limited repairs to the object before painting.

It finally is an object of the invention to perform these operations in an environmentally safe manner, and so as to realize for the customer significant savings in labor, transportation, and facility costs.

Additional objects, advantages, and novel features of he invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a transportable wash and paint facility designed for the cleaning and painting of grease containers, as more fully described in this application.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF INVENTION

Figure 1:
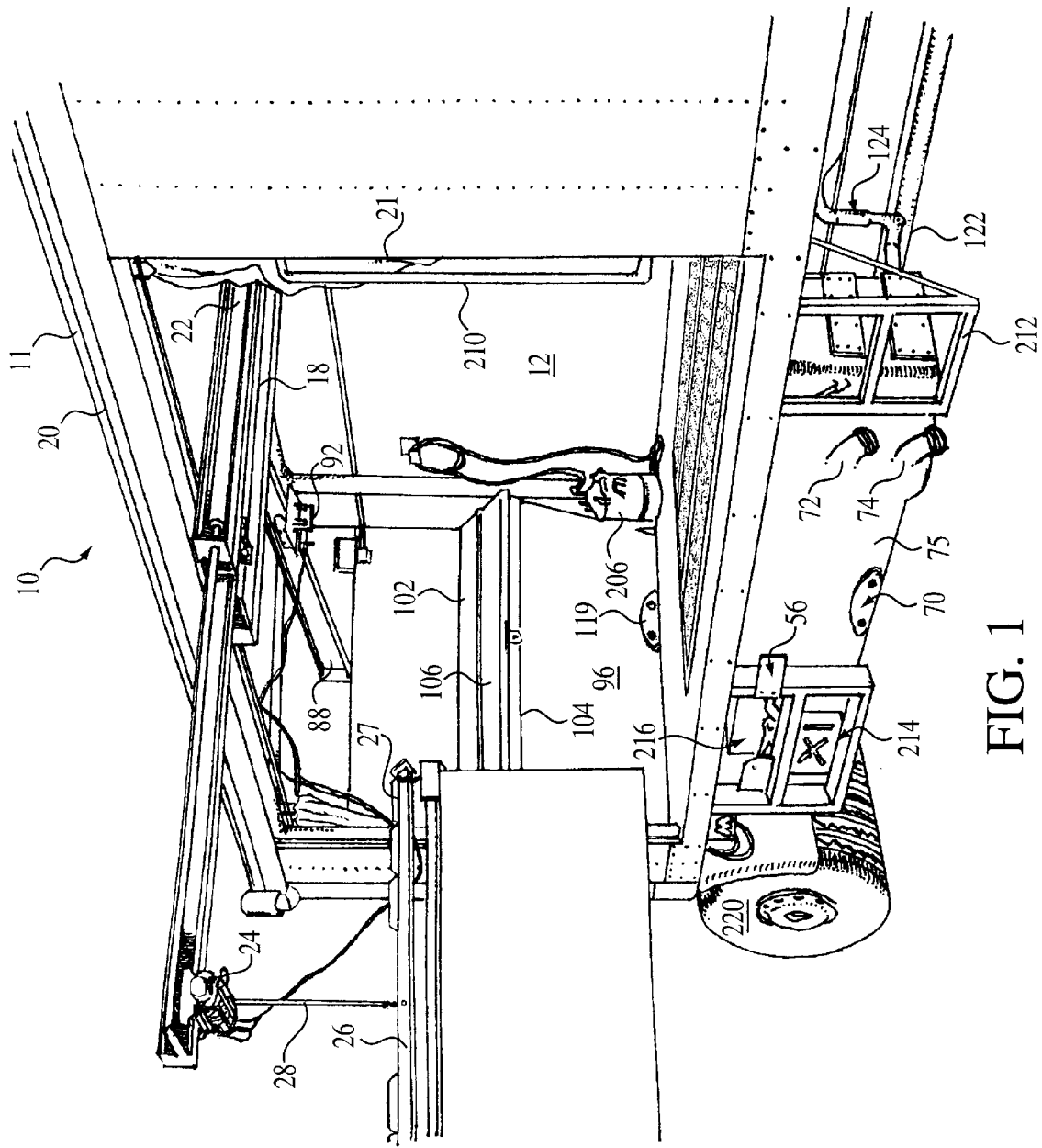
FIG. 1 is a view in perspective of the trailer opening and deployed grease container boom of the wash and paint facility of the present invention.

Referring to FIGS. 1–10, a wash and paint facility 10 is provided, which includes trailer 11 having a wash and paint room 12 and utility room 13 separated by bulkhead 14, and it is mounted to tractor 15 for pulling, thereby. Grease container 16 having lid 17 is loaded or unloaded into facility 10 by means of extendable boom 18 mounted on support beam structure 19 along ceiling 20 of trailer 11. Boom 18 is extended and retracted through trailer side port 21 by means of actuation of boom hydraulic cylinder 22. Trailer side port 21 is located in the sidewall of wash and paint room 12 in trailer 11. Actuation of winch 24 allows raising and lowering of container 16 by means of pick up bar 26, adjustable chain and bracket 27, and winch cable 28. Adjustable chain and bracket 27 may be used for different container sizes and for quick moving of chain rings to fit the different sizes of containers for picking up.

High pressure washer 30 is mounted on floor 32 of utility room 13 and includes fluid pressure tank 34, delivery hose 36 and hose nozzle 38, nozzle 38 being deployable by an operator to wash container 16. Wash and paint room 12 has floor 39 which includes grate assembly 40 which allows wash fluid to drain from the cleaning operation within paint and wash room 12 for recycling to the high pressure washer 30.

Separating tank 42 is mounted below floor 32 and is of three stages. The first stage is screen basin 44 located immediately below grate assembly 40. Screen basin 44 contains pre-screen basket 46 for catching large objects and which may be removed for cleaning by removing grate assembly 40. The second stage of separating tank 42 is open catch tank 48 located below screen basin 44 and which catch smaller objects and includes water skimmer 50 located in its upper portion, operable to separate floating heavy oils and dirt from the collected fluid surface. Oil removed by skimmer 50 is removed to a oil skimmer compartment 51 which can be drained at appropriate intervals by means oil skimmer fluid outlet 52. Oil skimmer 50 is rotated by means of skimmer motor 54 mounted to trailer 12 by mans of skimmer motor mounting bracket 56. The third stage of separating tank 42 is lower catch tank 58 located below open catch tank 48 and separated therefrom by horizontal separating wall 60. Catch tank 58 acts as a settling tank, letting silt settle out of the solution. Cleaning fluid or solution flows through transfer tubes 62 having orifices 64 along the underside of a horizontal portion to pick up solution and a vertical portion to allow its draining to lower catch tank 58. Oil roller cover 66 is located over skimmer 50 and is removable for cleaning and repair of the skimmer assembly. Basket braces 68 are located in the upper portion of open catch tank 48 for supporting screen basket 46 at the appropriate level in separating tank 42. Side spray bar 69 is located in sidewall of tank 58 to allow flushing with fresh water. Side cleanout cover 70 is located in the lower portion of lower catch tank 58 to facilitate its cleaning. Open catch tank drain 72 is located so as to allow draining of open catch tank 48 and lower catch tank drain 74 is located so as to allow draining of lower catch tank 58 through outer wall 75, respectively. The outer wall 75 of separating tank 42 is preferably of double wall construction to prevent spilling of fluid through damage to the wall.

Tank cleanout covers 76 and are located in the rear portion of outer wall 75 so as to facilitate cleanout of open catch tank 48 and lower catch tank 58, respectively. Air removal pipe 77 is located in the rear portion of outer wall 75 and connects with the interior of lower catch tank 58 immediately below horizontal separating wall 60 so as to allow the escape of trapped air as lower catch tank 58 fills with solution and extends to a point above the filled level of open catch tank 48 to avoid loss of solution therethrough.

Figure 4:
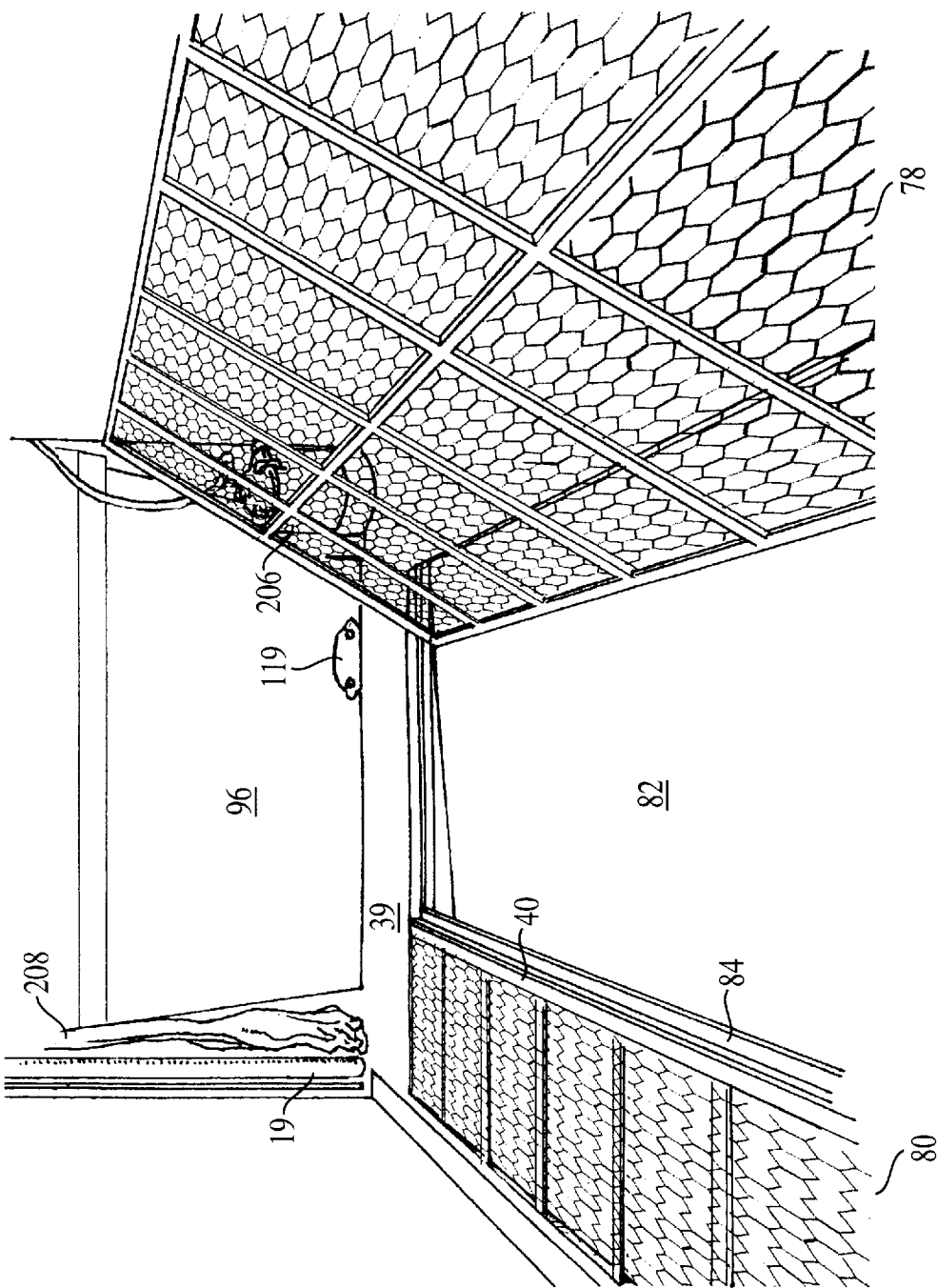
FIG. 4 is a detail of the wash and paint section of FIG. 3 illustrating the grates in the floor thereof.
Figure 5:
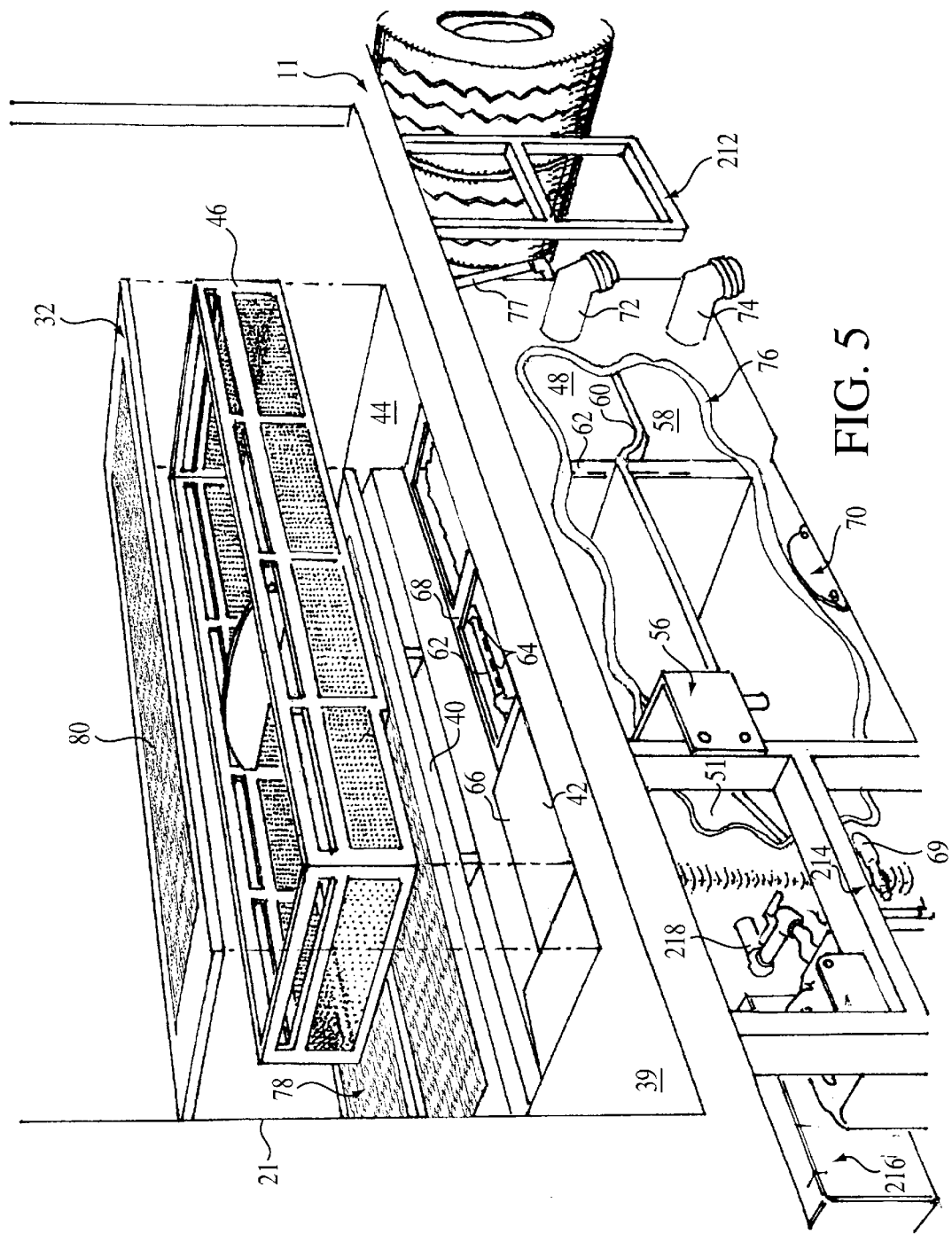
FIG. 5 is an exploded view in perspective of the grate and a cutaway view of the solution catch tank of the present invention as mounted on the trailer of FIG. 1.
Figure 6:
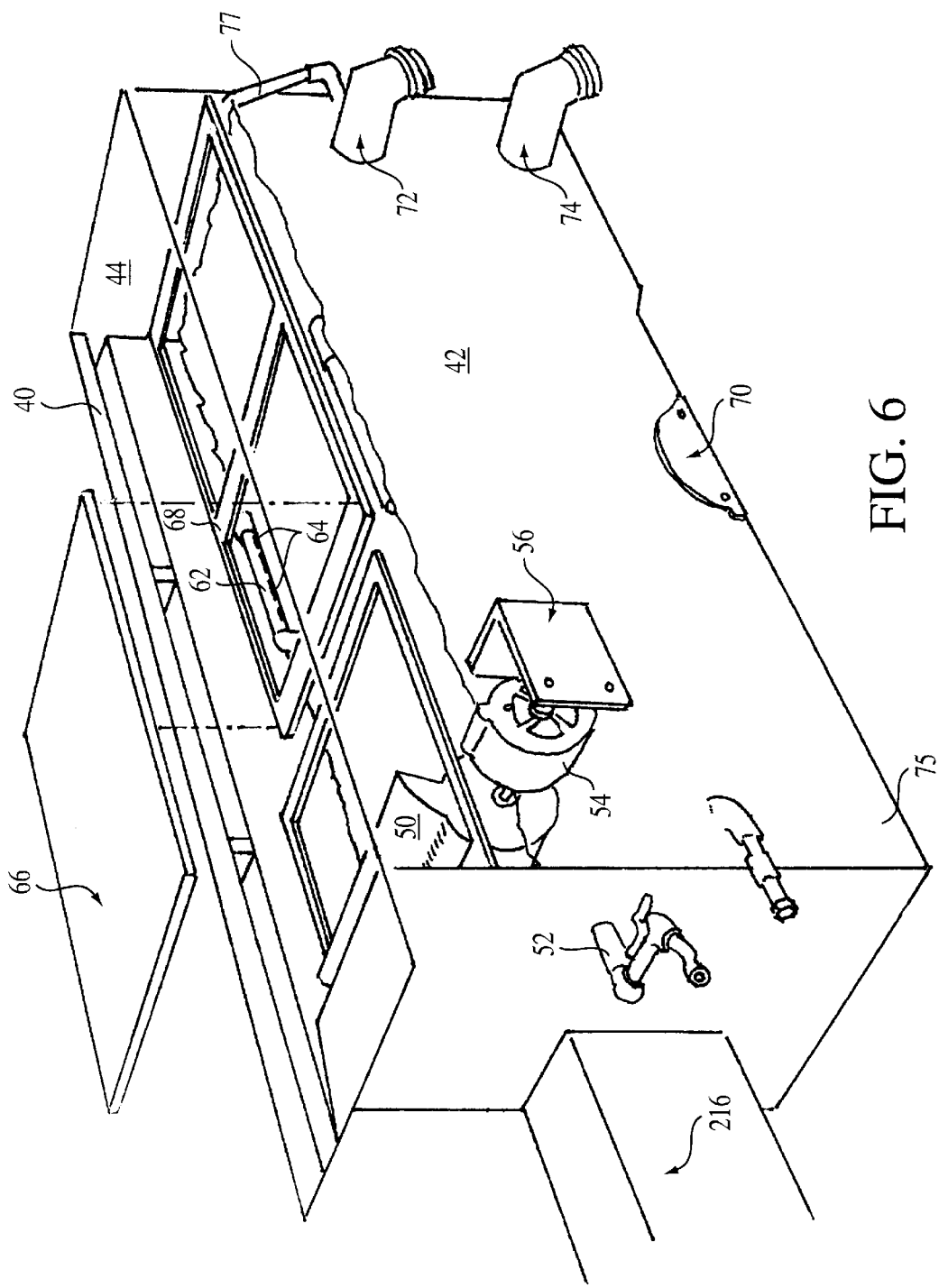
FIG. 6 is a view in perspective of the solution catch tank system of FIG. 5 illustrating the oil skimmer device.

As best seen in FIG. 4, grate assembly 40 consists of large grate 78 and small grate 80. Large grate 78 covers a sloping portion 82 of trailer floor 32. Small grate 80 is removably located over separating tank 42 and supported by angle brace 84. Solution from the washing operation can thus drain through large grate 78 along sloping floor portion 82 and into the separating tank 42, or directly through small grate 80 into separating tank 42.

Figure 7:
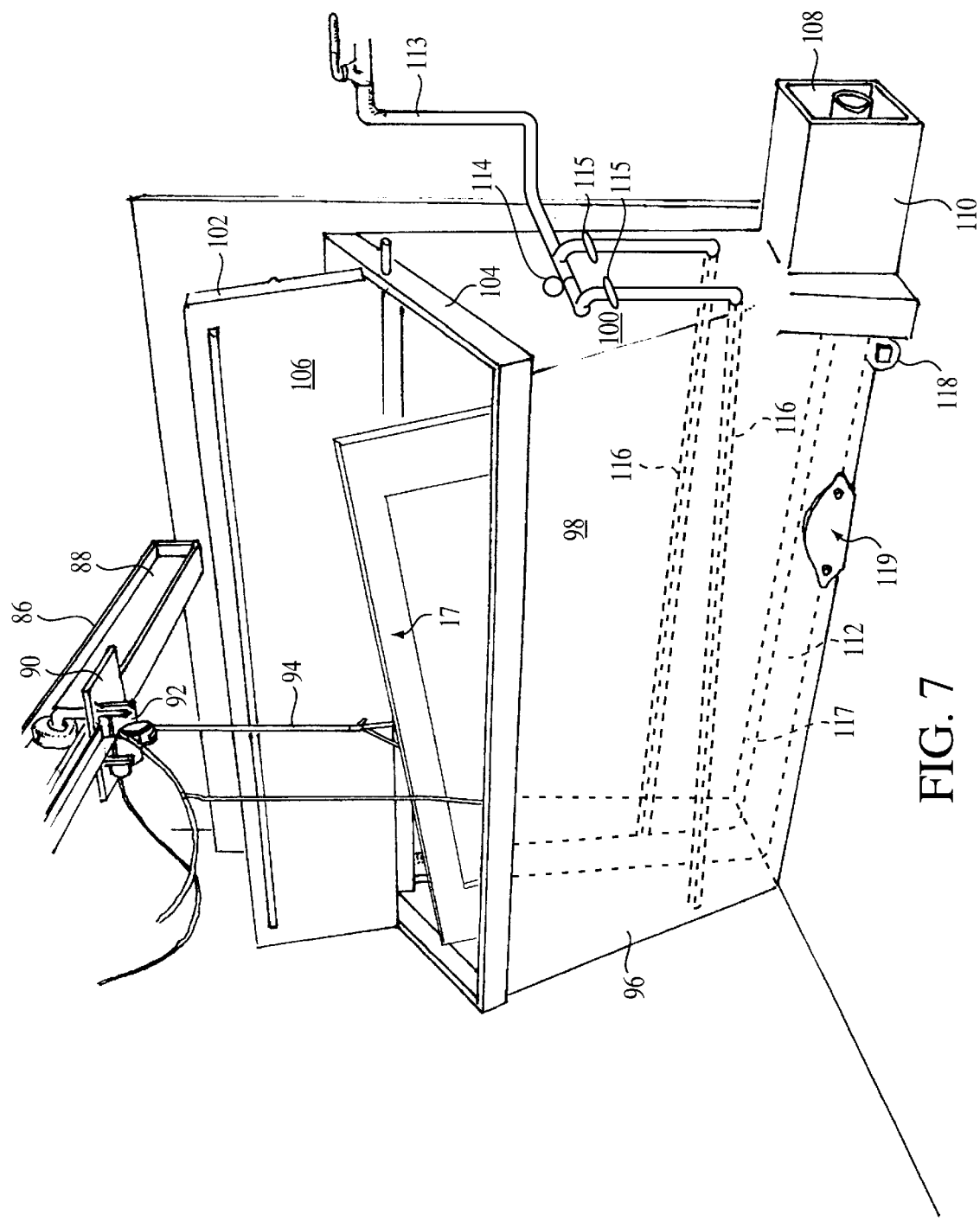
FIG. 7 is a view in perspective of the lid soaking device and lid boom as mounted in the trailer of FIG. 1.

Container lid hoist 86, as best seen in FIG. 7, is mounted on support beam structure 19 along trailer ceiling 20 and includes lid hoist beam 88 and hoist trolley 90 mounted so as to travel along hoist beam 88. Hoist winch 92 is located on trolley 90 and includes winch cable 94 which attaches to container lid 17 and is operable to raise and lower container lid 17. Through operation of lid hoist 86 container lid 17 may be removed from container 16 and transported to lid cleaning vat 96.

Lid cleaning vat 96 is located on floor 39 near grate assembly 50 and includes vat sidewalls 98, vat end walls 100 and vat lid assembly 102. Vat lid assembly 102 includes vat lid assembly frame 104 and hinged vat lid 106. The vat sidewall 98 adjacent grate assembly 40 is sloped or tapered inward toward its lower end to allow easy insertion and removal of container lid 17 and to facilitate the heating thereof. Heating control 108 for vat 96 is located in heat control box 110 between vat end wall 100 and the outer wall of trailer 12. Control 108 is thus accessible from the exterior of trailer 12 and the pilot for heat control 108 is vented to the exterior for safety reasons. Heating control 108 controls heat input to vat 96 by means of heating tubes 112 located in the lower portion of vat 96. Air injection line 113 supplies compressed air regulated by pressure regulator 114 and ball valves 115 to air injection tubes 116 located in the lower portion of vat 96 to agitate solution in vat 96. Ball valves 115 can be individually set to adjust air flow through individual air injection tubes as desired to affect agitation in desired portions of vat 96. Air injection tubes 116 are so located and configured so as to support lid 17 after cleaning. Removable catch basket 117 is located in vat 96 and serves to catch trash for convenient removal without draining vat 96. Vat drain 118 is located at the bottom of vat 96 and provides a means for draining vat 96. Vat side cleanout cover 119 is located at the base of wall 98 of vat 96 and allows removal to provide access to remove accumulated dirt from the bottom of vat 96.

Figure 8:
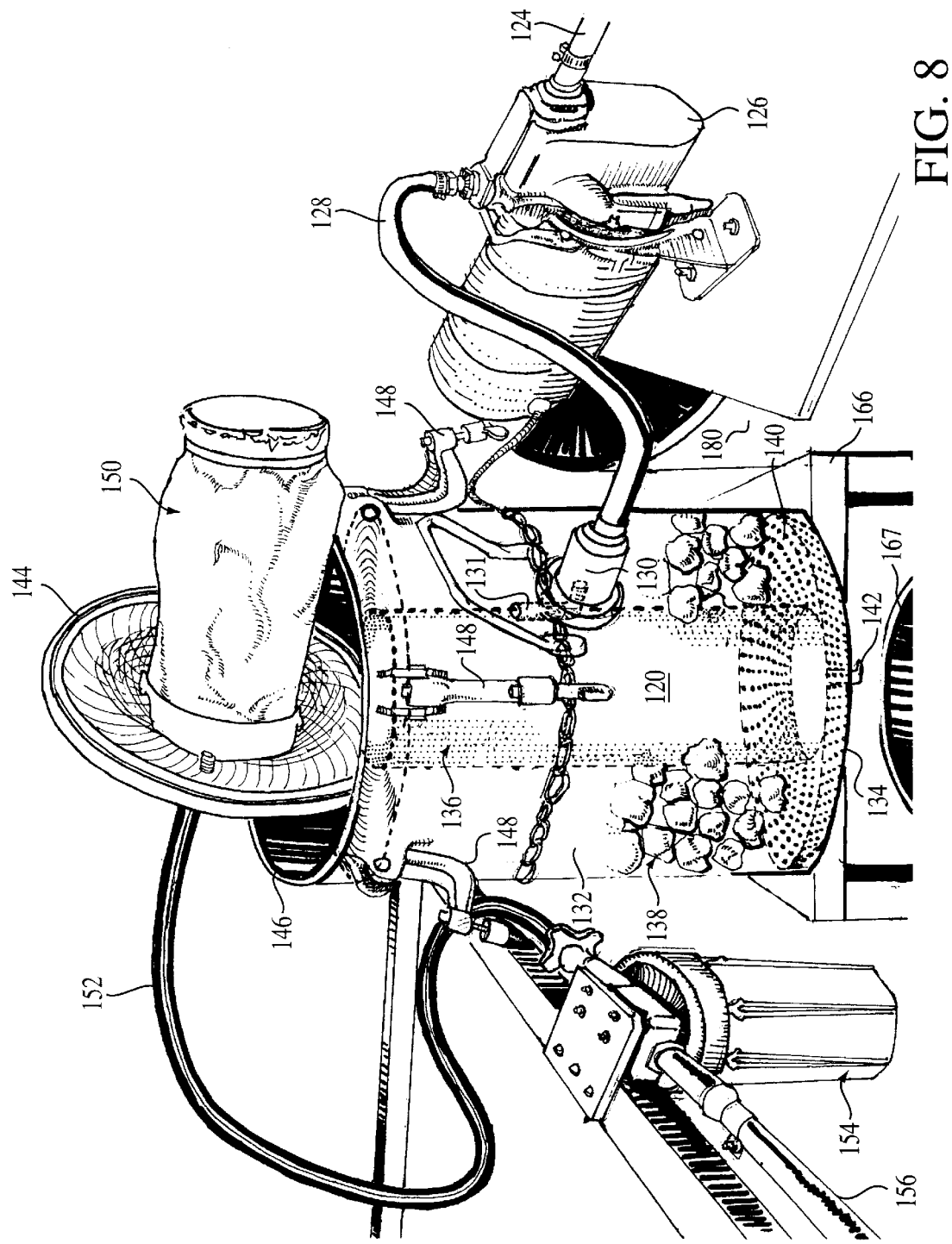
FIG. 8 is a view in perspective of the solution filter system of the present invention.
Figure 9:
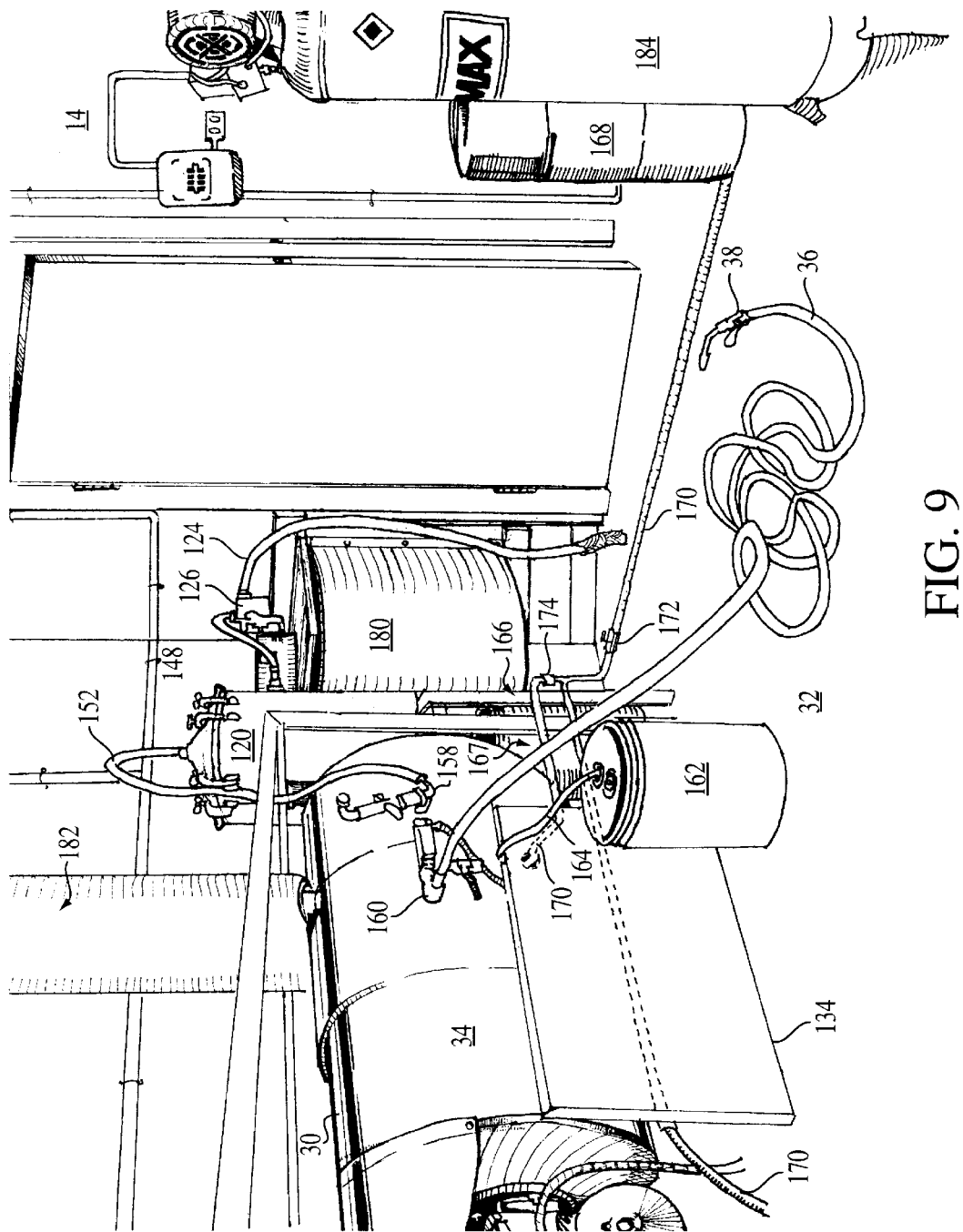
FIG. 9 is a view in perspective of the utility room within the trailer of the present invention.
Figure 10:
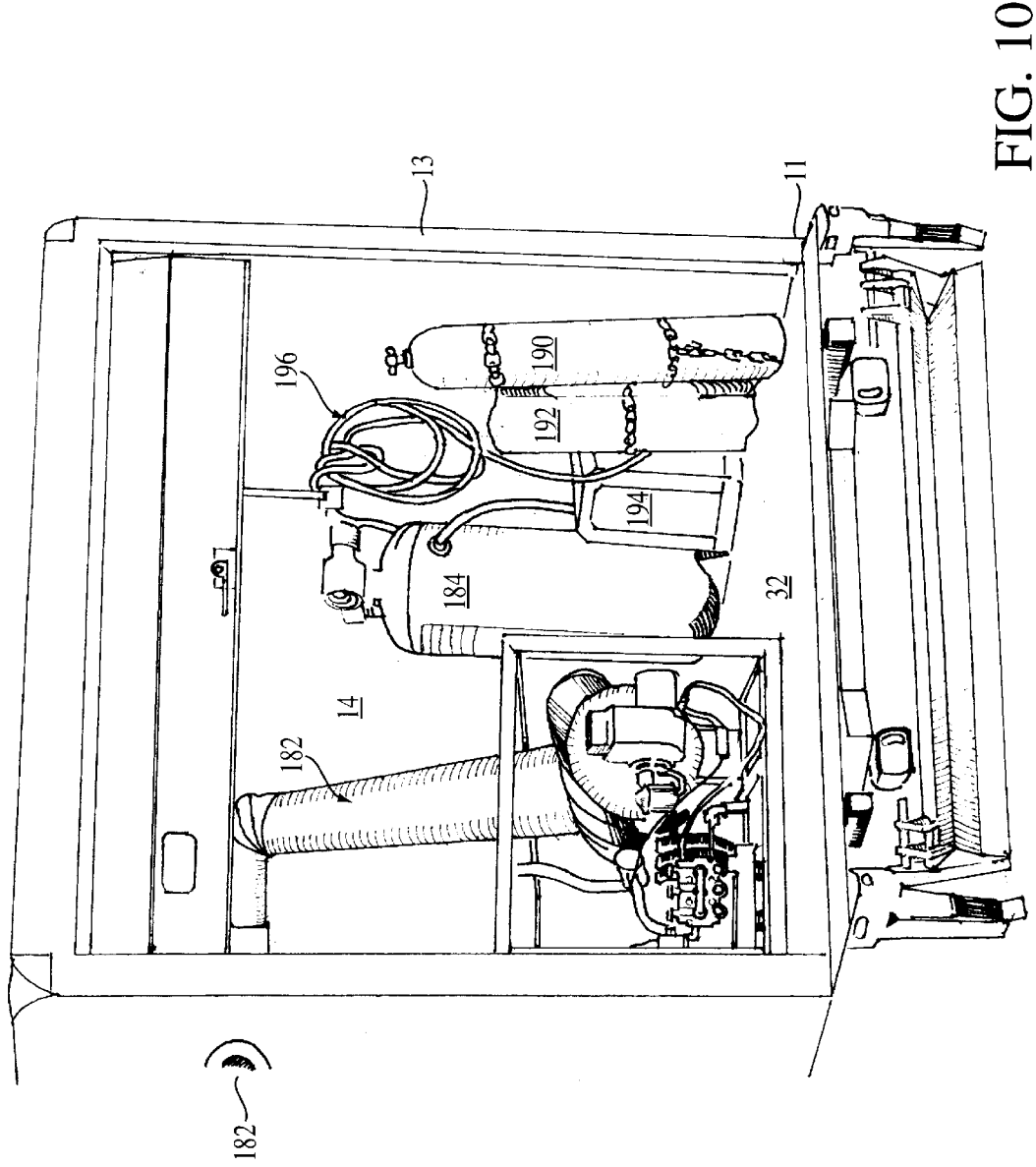
FIG. 10 is a view in another perspective of the utility room depicted in FIG. 9.

Filter tank 120, as best seen in FIGS. 8–9, is located within utility room 13 and is in fluid communication with lower catch tank 58 by means of lower catch tank outlet 122, delivery line 124, recycle pump 126, recycle pressure line 128 and filter tank inlet 130. Catch tank outlet 122 has a check valve therein (not shown) to maintain liquid prime in recycle pump 126. Water jet 131 is connected to inlet 130 and directs solution tangentially into tank 120. Filter tank 120 is generally cylindrical, having filter tank wall 132 and filter tank bottom 134. Inner cylindrical screen 136 is located along the vertical axis of filter tank 12. Stones 138 are located in the annular volume between filter tank wall 132 and inner cylindrical screen 136. Water jet 131 directs inlet solution so as to spin through the stone-filled annular volume forming a first filtration stage. Bottom sieve plate 140 is generally conically shaped and is located on bottom 134. Bottom sieve plate 140 slopes downward from a peripheral location along wall 132 to a central location coinciding with the lower end of cylindrical screen 136 and serves to support stones 138 in a manner which allows the draining and backflushing of the stone-filled annular volume located thereabove. Filter tank drain 142 is located in filter tank bottom 134 for draining and backflushing of filter tank 120. Filter tank lid 144 acts as an upper removable closure for filter tank 120, being capable of sealing engagement with filter tank rim 146 by means of lid clamps 148. Cylindrical screen filter 150 is concentrically mounted to the underside of lid 144 so as to occupy the volume within cylindrical screen 136 when lid 144 is in place for filtering operation, thus forming a second filtration stage. Filter tank outlet line 152 is in fluid connection with the interior of cylindrical screen filter 150 through lid 144 so as to remove filtered solution from filter tank 120. Final solution filter 154 forms a third filtration stage and is located in fluid connection with filter tank outlet line 152 and filtered solution transfer line 156 for final removal of fine solids carried over from filter tank 120.

Filter tank 120 may be conveniently backflushed for cleaning by introducing pressurized cleaning fluid through line 152 into filter tank 120 and out drain 142. Filtered solution is introduced into fluid pressure tank 34 by transfer line 154 at pressure tank inlet 158. Delivery hose 36 for wash nozzle 38 is connected to pressure tank 34 at delivery hose connection 160.

Makeup solution is prepared in makeup solution tank 162, located in utility room 13, and delivered when required to pressure tank 34 through makeup solution transfer line 164. Filter tank 120 is supported by filter tank stand 166 above filter drain tank 167 which catches solution from filter tank drain 142. Fresh water tank 168 is located in utility room 13 and provides fresh water for rinsing through fresh water hose 170 to high pressure washer 30, flow of which is controlled by fresh water valve 172. Soap solution valve 174 allows control of soap solution flow.

Exhaust fan duct 180 is installed between an outside wall of utility room 13 and bulkhead 14 to remove collected vapors from wash and paint room 12 to the exterior of the trailer by means of exhaust fan outlet 181 in trailer outside wall. Exhaust outlet pipe 182 is located in utility room 13 so as to remove vapors from the vicinity of high pressure washer 30 and in particular the gasoline motor associated therewith. Air compressor 184 is located in utility room 13 and supplies compressed air for painting and buffing operations. Oxygen tank 190 and acetylene tank 192 supply gas welder 194. Arc welder 196 is located in utility room 13. Gas welder 194 and arc welder 196 are useful in repairing any damage to container 16 or lid 17.

Figure 2:
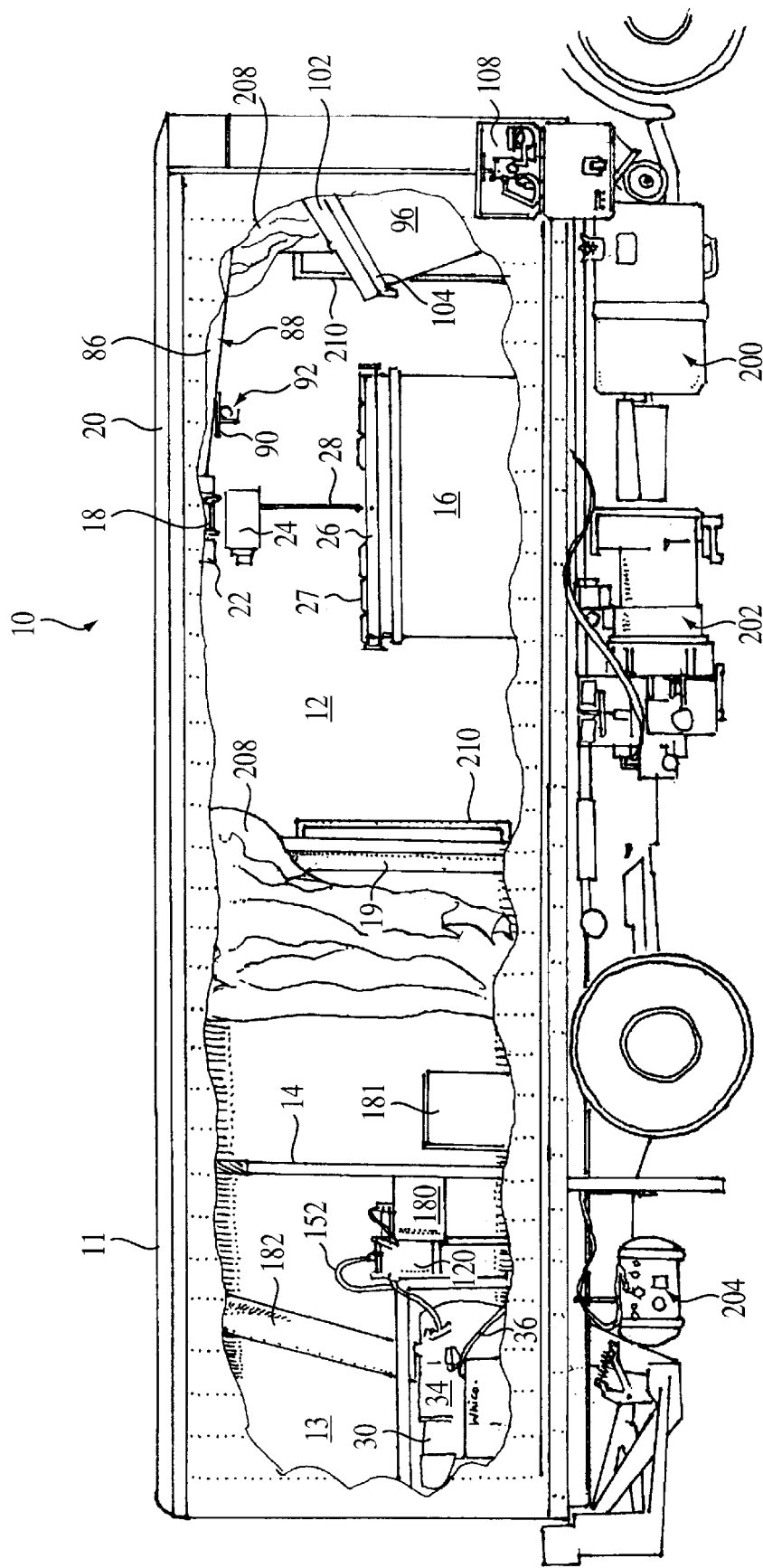
FIG. 2 is a cutaway view in elevation of the opposing side of the trailer of FIG. 1.
Figure 3:
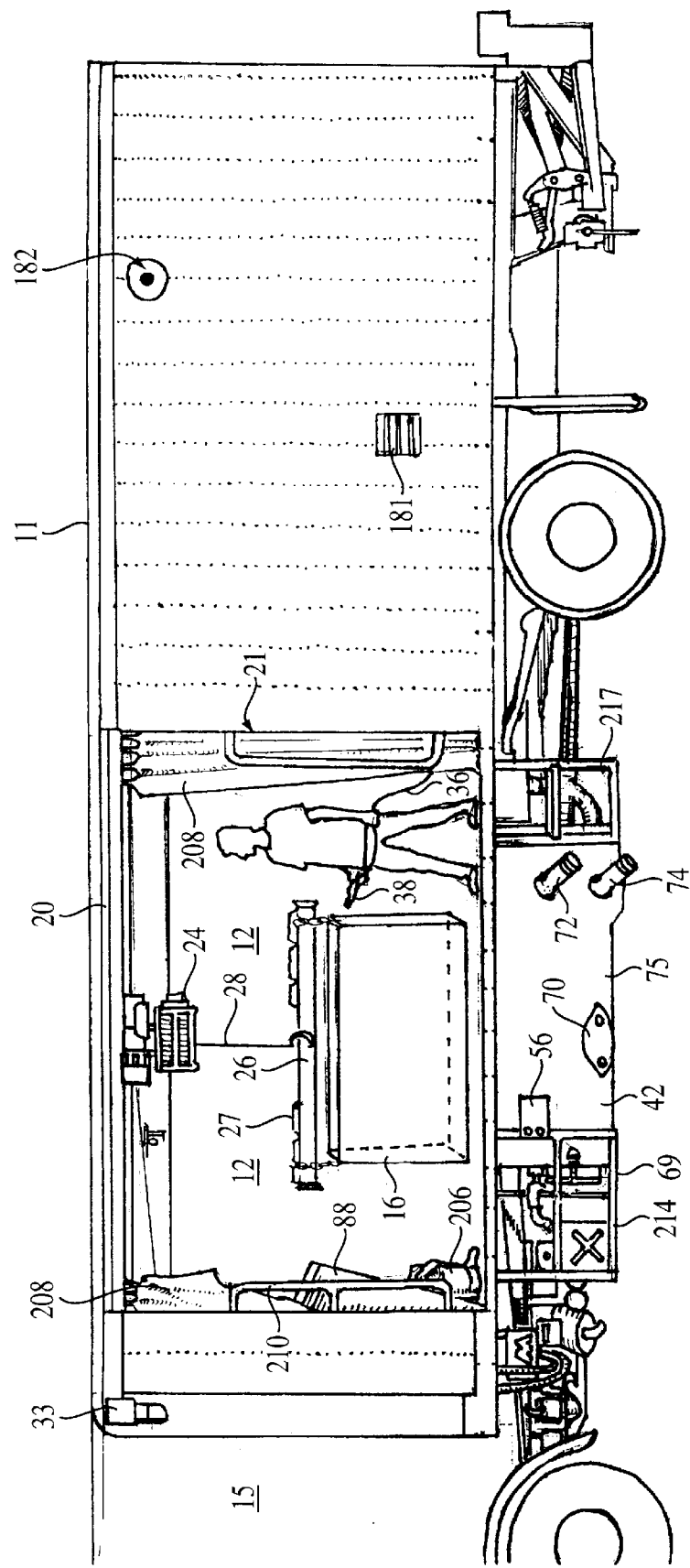
FIG. 3 is a view in elevation of the trailer of FIG. 1 illustrating an operator cleaning a grease container in the wash and paint section.

Fuel tank 200 is mounted on undercarriage of trailer 11 as best seen in FIG. 2 so as to provide fuel to tractor 15 and electric generator 202, which supplies electricity for operation of the facility. Propane tank 204, located on trailer 11, provides fuel to the hot water vat heater.

Painting pot 206 is located in wash and paint room 12 and is operable to paint cleaned and prepared surfaces of container 16. Painting pot 206 is operated on compressed air from air compressor 184 by means of a compressed air distribution line(not shown). Side curtains 208 are located in trailer sidewall port 21 of wash and paint room 12 and may be closed during container cleaning and painting operations. Handle bar 210 is located in port 21 to provide for easy entry by the system operators. Steps 212 and 214 are located below floor 39 and enable access to wash and paint room 12 by the operators. Contamination container 216 is located below trailer floor 32 and in front of open catch tank 48 and is removably mounted on step 214 for easy cleaning. Contamination container 216 receives oil removed by skimmer 50 through oil skimmer fluid outlet 218 and provides for convenient periodic disposal of collected oil through oil skimmer fluid outlet 218.

The self-contained, transportable wash and paint facility of the present invention may be housed in a 30-foot, flat-bed truck, or in a 30-foot to 40-foot trailer of conventional design, configured with a side door opening. The vehicle selected must be capable of carrying 28,000 pounds and provide support for all the water tanks and equipment which comprise the facility.

For purposes of this disclosure, the invention will be described in the operations of cleaning and repainting grease containers. Such containers are commonly found outside of restaurants and accept used organic oils which are the by-product of grilling, frying, and other operations conducted by restaurants. However, the various steps described also are applicable to the washing and painting of other objects by use of the facility of the current invention.

Such a facility is able to process as many as eight grease containers during an eight hour shift. However, the process rate is dependent on how dirty the containers are, or how long they have set without servicing, and travel time. It requires two workers to operate the facility, and the men need to work cooperatively to have a productive day. For example, in the operations of lifting and moving a container, one man is deployed at the container while the other is operating the winch. During cleaning, one man is operating the high pressure spray gun, while the other man is preparing the container in advance of the spraying operation by hand-scraping dirt, grease, and decals from the container.

The facility is transported to the location of the container to be serviced and deployed alongside the subject container and adjacent the side door. A boom, attached to a beam affixed to the roof of the facility, is telescoped out on rollers approximately 5 feet from the truck, through the open side door. Attached to the boom is a readily moveable trolley and electric winch, which is attached to the container. The container is hoisted up by means of the electric winch and slid into the truck to the wash bay. The winch is an 8,000 lb winch mounted on 4" trolley wheels built into the carriage. The container is placed atop the grates in the wash area and the lid of the container is removed for special processing.

It is particularly difficult to degrease and clean the lids of grease containers, as the lids over time develop a very heavy buildup of restaurant grease. To enable the efficient cleaning of grease from the lids of grease containers, the facility has been equipped with a lid tank of unique design. The lid tank is designed to accept a single container lid and allow it to soak submerged in hot clean solution while the rest of the container is cleaned. After soaking in the tank for approximately fifteen minutes, the lid can more easily be cleaned.

The lid of the grease container is removed from the container and placed in the lid tank on its side underwater, with an air injection system to help clean off the grease. A caustic solution is used, heated to approximately 160° F. Heating of the tank is realized by means of a propane fired heater which fires a heating tube in the bottom of the lid tank.

The lid tank is of a unique design. The tank is 12" wide at the bottom, and 30" wide at the top. With such a design, a container lid can be more easily placed in the tank in the limited area available inside the truck. Also such a design facilitates heat transfer to the solution in the tank. Across the bottom of the tank is a 3" heat exchanger pipe. Next to the rear wall the tank, on the opposite side of tank there is a clean out basket built around the 3" pipe. This allows for the removal of solids that fall off lids during soaking without completely cleaning tank. In the back of the lid tank are water baffles to prevent the solution from splashing during transit.

The lid tank contains a mixture of 250 gallons of fresh water and approximately 35 pounds of anhydrous sodium hydroxide, which is heated to 160°. A product which has proven effective is Pels® Caustic Soda Beads and Pels-Plus.

By soaking and pre-cleaning container lids in the lid tank, time is saved a better job is realized. A boom and winch is used to pull the lid out of the tank for safety reasons. The winch is a 1500 lb winch mounted on a 4" trolley wheel built into a carriage.

While the lid is soaking in the lid tank, the grease container is cleaned. First, heavy accumulations of grease and dirt are hand scraped from the container. Then, a high pressure spray of heated solution is trained on the container, which removes dirt and grease from the container.

During the high pressure wash, the cleaning solution, dirt, and grease drop through the floor grates and flow into a specially-designed three part separating tank. The first part is a screen basin, immediately below the floor grates, designed to catch and hold larger particles of dirt and grease. The second element is an open catch tank to catch solution passing through the screen basin. Water skimmers are built into the top of this tank to separate out the heavy oils and dirt. This open catch tank also has a roller to skim off oil on the surface of the solution. The skimmed oil is caught in a small storage tank for later disposal. Solution from the open catch tank falls to the bottom tank through skimmer tubes, such tubes terminating approximately 2 inches from the bottom of the bottom tank.

Recirculated solution for the high pressure spray gun is removed from the bottom tank by means of a ½ HP centrifugal pump with a pumping capacity of 20 gals of solution per minute. The pump has a check valve built into the tank so it will not loose its prime. The intake for the pump is in the middle of the bottom tank, so it will receive the cleanest solution in the bottom tank.

Solution is pumped from the bottom tank to a multi-stage filtering tank for final filtering before being returned to the steamer and to the high pressure washer. First the solution is forced through water jets, which makes the solution spin inside the filtering tank. Then the solution is forced through a bed of disparate rocks or, alternatively, a fine gravel filter (pebbles of approximately ¼ inch diameter), which catches particles of paint and other foreign materials in the solution. Then the solution is forced through a cylindrical screen filter of 60 mesh and then a final filter that catches fine particulates before the solution is returned to the steamer. The final filter has a 100–200 mesh screen to keep fine dirt particles from entering the pump. Dirt will destroy the packing in the pump in just a few hours without adequate filtering.

From the final filter the solution is fed through a Whitco steamer to reheat the solution before it is returned to the high pressure washer. The Whitco steamer is diesel fired, and powered by an 18 HP Kroeler engine. The steamer heats the solution to between 160 and 180 degrees. The high pressure washer operates at 3000 PSI, and sprays 6 gals of solution per minute.

Approximately 150 to 180 gallons of solution are continuously recirculated through the system. The solution is made up of a mixture of fresh water, two to three pounds of solid sodium hydroxide dissolved in the water, and one gallon of a heavy duty liquid degreaser.

After the container and then the lid are cleaned by use of the high pressure washer, they are rinsed with fresh water. Fresh water is available from a fresh water tank, such water being fed through the steamer to be heated prior to delivery to the high pressure washer. There is a valve at the steamer to select either solution or fresh water to flow through the steamer for delivery to the high pressure washer. Fresh water is also used to clean out the pump on the washer between containers.

The lid is reinstalled, and the container is allowed to dry. The container is then prepared for painting. Depending upon the condition of the existing paint on the container, either a nylon scouring wheel, a wire wheel, or sanding disk is used to prepare the old paint for repainting. Painting of the containers can be accomplished either inside the wash room or performed outside adjacent to the truck.

Painting of the containers is accomplished through the use of HVLP paint guns, which are environmentally safe. When mixed with lots of air, there is no overspray, so the paint does not drift. A water-based, alkaloid enamel paint is used, which is thinned by water so as not to exceed 3.5 V.O.C. The paint sets within minutes. The paint is housed in 2 gal and 5 gal pots. The use of large pots eliminates the need for constant refilling, and there is no spilling because there are no open containers. The paint pots are pressured by an air compressor. The air compressor is run by a 35 watt Lister generator that is mounted on the outside of the truck. This generator runs the lights and exhaust fans for the paint room. It is diesel powered.

Often containers are found to be in need of repair. The facility maintains tools for straightening containers and for repairing damaged areas, such as holes or tears. Hand tools, hydraulic jacks, electric arc welding equipment, and a gas torch are used for such purposes.

At the start of each workday, workers ensure that the facility has fuel for the steam cleaner, and that there is fresh water in the fresh water tank. They also check to see if there is adequate paint in the paint pots. They also clean out the screen basin, as it proves easier to clean after the solution sets overnight. At the end of the day, the workers check to see that the steamer pilot is lit and the propane tank is full, and perform cleaning and maintenance as necessary. Once a week the entire system is drained and cleaned, and fresh solution is prepared.

The particular sizes and equipment discussed above are cited merely to illustrate a particular embodiment of this invention. It is contemplated that the use of the invention may involve components having different sizes and shapes as long as the principle, the employment of a transportable trailer mounted container wash and paint facility, is followed. It is intended that the scope of the invention be defined by the claims appended hereto.

I claim:

1. A tractor-driven trailer having a self-contained, trailer-mounted, transportable wash and paint facility for a grease container having a removable lid comprising:

(A) a wash and paint room defined by a sidewall, a ceiling, and a floor of said trailer, and a bulkhead within said trailer, said wash and paint room further comprising:

(1) an extendable boom mounted near the ceiling of said trailer and extendable through a sidewall port located in a sidewall of said trailer, said sidewall port defining one side of said wash and paint room, said boom being capable of extending to assist in retrieving said grease container from a location outside said trailer, and retractable to assist in moving said grease container to a location inside said trailer for washing and painting;

(2) a lid cleaning vat for soaking said grease container removable lid;

(3) a lid hoist mounted near the ceiling of said trailer and located to assist in moving said lid from said grease container to said cleaning vat and, subsequently, returning said lid to said grease container;

(4) a catch tank located in said trailer floor for receiving wash solution from the grease container wash room, said catch tank having a grating covering same for supporting said grease container and operator personnel; and (5) a paint system for spray painting the cleaned grease container and lid; and (B) a utility room adjacent said wash and paint room and separated therefrom by said bulkhead, said utility room comprising:

(1) a high pressure wash system having a high pressure, heated washer and a high pressure hose and nozzle, said hose and nozzle being extendable into said wash and paint room for use in cleaning said grease container and lid;

(2) a filter system having a first delivery line connected with said catch tank for recycling contaminated wash solution and a second delivery line connected with said high pressure wash system for delivering filtered wash solution thereto.

2. The wash and paint facility of claim 1 wherein said catch tank comprises an upper compartment and a lower compartment and skimmer tubes located between said upper compartment and said lower compartment and said lower compartment and so configured as to draining wash solution from said upper compartment to said lower compartment while leaving the bulk of floating grease in said upper compartment.

3. The wash and paint facility of claim 2 wherein said upper compartment of said catch tank further comprises a removable screen basket located below said grate for screening, collecting and removing trash collected from said wash room.

4. The wash and paint facility of claim 3 wherein said grate is split into two portions and one grate portion is removable for access to said screen basket, the other grate portion covering a sloping trailer floor portion which drains into said catch tank.

5. The wash and paint facility of claim 2 wherein said upper compartment comprises an oil skimmer for skimming floating grease from the surface of collected wash solution.

6. The wash and paint facility of claim 5 wherein said oil skimmer comprises a turnable roller, a motor for operating said turnable roller, a wiper, a compartment for catching skimmed oil, and oil skimmer outlet, and an oil collection tank for receiving skimmed oil from said oil outlet.

7. The wash and paint facility of claim 2 wherein said skimmer tubes have an upper portion so configured as to skim wash solution from under a floating layer of oil, and a lower portion extending to the vicinity of the bottom of said lower compartment.

8. The wash and paint facility of claim 1 wherein said filter system comprises an annular first filter and an axial second filter located concentrically within said annular first filter.

9. The wash and paint facility of claim 8 wherein said first filter and said second filter are located within a common closed container.

10. The wash and paint facility of claim 9 wherein said annular first filter contains disparate gravel or rock as a filter medium.

11. The wash and paint facility of claim 9 wherein said annular first filter has a tangential inlet for introduction of recycled wash solution into said first filter.

12. The wash and paint facility of claim 9 wherein said axial second filter is a cylindrical screen filter located within and in fluid communication with said annular first filter through a screen defining an inner wall of said annular first filter.

13. The wash and paint facility of claim 12 further comprising a final solution filter located in said second delivery line between said second axial filter and said high pressure wash system.

14. The wash and paint facility of claim 1 wherein said lid cleaning vat comprises front, rear, and side walls, a floor and a pivotable lid, said front wall sloping inward toward the floor, thereof.

15. The wash and paint facility of claim 14 wherein said lid cleaning vat further comprises a heater and a heating tube connected therewith and extending into a lower portion of said cleaning vat for heating a caustic solution contained, therein.

16. The wash and paint facility of claim 15 wherein said led cleaning vat further comprises an air compressor and agitation tubes connected therewith and extending into said cleaning vat, said agitation tubes being perforated so as to introduce agitating compressed air to assist in cleaning a soaking lid held in said cleaning vat.

17. The wash and paint facility of claim 1 further comprising an electric generator mounted under said trailer floor for supplying electrical power to the wash and paint facility.

18. The wash and paint facility of claim 15 further comprising a propane tank mounted under said trailer floor for supplying fuel to said high pressure wash system and said lid vat heater.

19. The wash and paint facility of claim 1 further comprising welding equipment located within said utility room for repairing grease containers as necessary.

20. A tractor-driven trailer having a self-contained, trailer mounted, portable wash and paint facility for a soiled object comprising:

(A) means for retrieving a soiled object from a location outside said trailer, placing said object within said trailer for washing and painting operations, and returning said object to said location;

(B) means for providing and spraying a hot cleaning solution onto said object within said trailer;

(C) means for spray painting said object once cleaned within said trailer;

(D) means for catching used cleaning solution located in the floor of said trailer in fluid communication with means to circulate said used cleaning solution to said means for providing hot cleaning solution;

(E) means in fluid communication with and located between said means for providing hot cleaning solution and said means for catching used cleaning solution for filtering said circulating used cleaning solution so as to allow its reuse; and (F) means for replenishing cleaning solution connected with said means for providing hot cleaning solution.

\* \* \* \* \*